April 14, 1953     K. R. DOUGLAS     2,634,626
AUTOMATIC TRANSMISSION
Filed Nov. 12, 1947
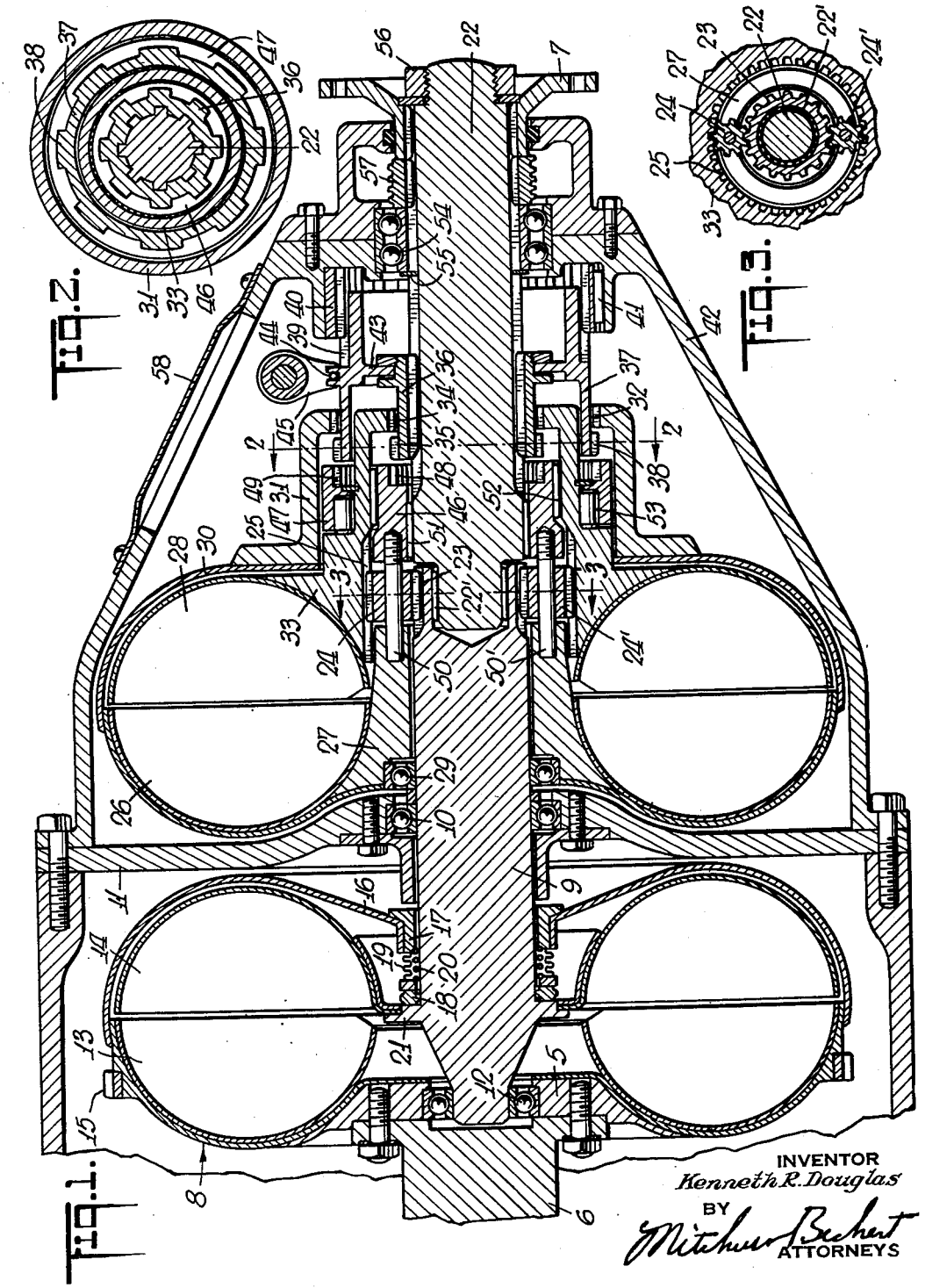
INVENTOR
*Kenneth R. Douglas*
BY
*Mitchell Bechert*
ATTORNEYS Patented Apr. 14, 1953

2,634,626

UNITED STATES PATENT OFFICE 2,634,626

AUTOMATIC TRANSMISSION

Kenneth R. Douglas, New York, N. Y.

Application November 12, 1947, Serial No. 785,210

1 Claim. (Cl. 74—688)

My invention relates to an automatic transmission having particular application to automobiles, tractors, trucks, gasoline and diesel-powered locomotives, and the like.

It is an object of the invention to provide an improved transmission of the character indicated.

It is another object to provide an improved automatic transmission wherein there may be an automatic selection of gear ratios for coupling an engine to a load in accordance with variations in the load.

It is a further object to provide an improved transmission having an infinite number of possible gear ratios, between certain limits.

It is a more specific object to provide an automatic transmission wherein there is a positive low-gear drive and an infinite number of possible higher gear ratios up to a ratio representing high-gear drive.

It is still another object to provide improved fluid-coupling means in an automatic transmission of the character indicated.

It is in general an object to meet the above objects with a system that is relatively simple, that is not likely to get out of order, and that is not subject to malfunction upon malfunction of the engine or of other parts of the vehicle.

Other objects and various further features of the invention will be pointed out or will occur to those skilled in the art from a reading of the following specification in conjunction with the accompanying drawings. In said drawings, which show, for illustrative purposes only, a preferred form of the invention:

Fig. 1 is a vertical sectional view of an automatic transmission incorporating features of the invention;

Fig. 2 is a sectional view taken in the plane 2—2 of Fig. 1; and

Fig. 3 is a fragmentary view taken in the plane 3—3 of Fig. 1.

Briefly stated, my invention contemplates a self-contained completely automatic transmission, utilizing fluid-coupling means between two of the three basic elements of a planetary gear system, to provide an infinite number of gear ratios, between limiting ratios representing, say, low gear and high gear, respectively. The nature of the coupling is preferably such that increased load torques, as when accelerating or climbing a hill, will automatically result in a proper selection of an appropriately reduced gear ratio so as to match the performance of the engine with the load demanded of it. Any desired clutch means may be employed to couple my transmission into the drive system of the vehicle, but in the form to be described I employ a fluid clutch, frequently known as a fluid flywheel.

Referring to the drawings, my invention is shown in application to an automatic transmission to be coupled at one end, as at the end plate 5, to a drive flange or other fitting on the engine crankshaft 6. Output from the transmission may be taken from a flange 7 at the back end, for attachment to the driveshaft of the vehicle. As indicated generally above, a clutch in the form of a fluid fly-wheel 8 may be employed to connect the engine to the automatic transmission. In the form shown, the clutch 8 drives an intermediate drive-shaft 9, which is shown supported in antifriction bearings 10 in a web 11 in the transmission frame. For alignment purposes, the forward end of the intermediate shaft 9 may be positioned by means of an antifriction bearing 12 seated in the end plate 5.

In the form shown, the fluid clutch or flywheel 8 is sealed and self-contained. It may comprise a pump member 13 and a rotor member 14 relatively rotatable on the common axis of shafts 6 and 9. The pump member 13 may carry a starter gear 15 on the outside thereof for engagement with the engine-starting mechanism (not shown). The pump member is shown to carry with it an extended housing member or plate 16 to complete the enclosure of the rotor member 14, and the inner lip or flange 17 of the housing member 16 may be sealed, as by a washer 18, expansible bellows 19, and resilient means 20, to a flange 21 on the intermediate driveshaft 9. The rotor member 14 is shown fixedly seated against a shoulder on the flange 21. It will be understood that at engine-idling speeds there may be insufficient coupling between the pump member 13 and the rotor member 14 to drive the intermediate shaft 9, but that with increasing engine speeds the coupling may increase and drive the shaft 9.

In accordance with the invention, I employ an automatic transmission to couple the intermediate drive shaft 9 to an output or driven shaft 22, for driving the output flange 7. Such automatic transmission preferably utilizes fluid-coupling means between two of the three basic elements of a planetary-gear system, comprising inner and outer gears and planet gear means. In the form shown, the inner or sun gear 23 is driven and may, therefore, be formed on the back end of the intermediate driveshaft 9. The teeth of pinion 23 mesh with planet gear means 24—24', and the planet gear means in turn mesh with an outer or ring gear 25 having an axis of rotation coinciding with the common axis of shafts 6, 9, and 22.

As indicated, two of the basic members of the planetary system are preferably fluid-coupled. In the form shown, one member 26 of a fluid-coupling system is connected by way of a ring piece 27 to follow rotation of the axes of planet gears 24—24' about the common axis of shafts 6, 9, and 22. The other member 28 of the said fluid coupling is carried with a ring member 33 and the gear 25. The ring piece 27 may be revolubly supported on antifriction bearing means 29 seated on the intermediate shaft 9. As in the case of the fluid flywheel 8 the fluid coupling in the automatic transmission may employ a housing plate 30 carried by the first or pump member thereof and extending substantially completely around the second or rotor member 28 thereof. The housing plate 30 may be employed for the better containment of the fluid which couples members 26—28, and it may also carry a flanged sleeve member 31 having clutch means in the form of radially inwardly extending dog-clutch teeth 32, for a purpose to be described.

To correspond with the dog-clutch teeth 32 which are fixed to the pump member 26 of the fluid coupling, the ring member 33 having the ring gear teeth 25 and carrying the rotor member 28 of the fluid coupling may also have clutch means in the form of dog-clutch teeth 34, which are shown facing radially inwardly, for engagement with the radially outwardly facing dog-clutch teeth 35 of a sleeve member 36. For gear-shifting purposes, the sleeve member 36 may be splined to the driven shaft 22, and it is slidable longitudinally forward or rearward of the neutral position shown.

To mate with the inwardly extending dog-clutch teeth 32 which are carried with the pump of the fluid coupling, I provide a clutch shifting member 37 with outwardly extending dog-clutch teeth 38. The shift member 37 is preferably locked against rotation with respect to the transmission frame, but it may slide longitudinally forward and backward of the illustrated neutral position. To permit such motion, the back end of the shift member 37 may be splined as at 39, to fit a correspondingly splined annular member 40 locked (as by a key 41) to the frame or housing 42 for the transmission. In the form to be described, I prefer that the sleeve member 36 and the shift member 37 slide more or less in unison in order to provide the necessary movement between forward, neutral, and reverse connections. For this purpose, an inwardly extending flange 43 on the shift member 37 may engage a groove on the sleeve member 36, and it will be clear that rotation of the sleeve member 36 may not be impaired by such connection. Conventional shifting means may be employed for the longitudinal displacement of members 36—37, and in the form shown a pin 44 on a clutch-shifting crank 45 engages a radially outwardly extending slot in the clutch-shift member 37. Conventional means (not shown) may be employed for rotational shifting of the crank 45.

For the other clutch-shift position, the dog-clutch teeth on members 36—37 may be engaged with two further ring members 46—47, representing connections to the planet gear axes and to the rotor 28, respectively. The ring member 46 is shown to have inwardly extending teeth 48 for engagement with the teeth 35 on the sleeve 36, and the ring member 47 includes inwardly extending teeth 49 for engagement with the teeth 38 on shift member 37. The ring member 46 is in effect an extension of the ring member 27, that is, it rotates bodily with the fluid-coupling pump member 26 and with the axes of planet gears 24—24'. In the form shown, studs 50—50' threadedly engage the ring member 46 and serve pivotally to support the planet gears 24—24' and also longitudinally to engage the ring member 27. If desired, antifriction bearing means in the form of needle rollers 22' may serve to maintain concentric alignment of shafts 9—22, while needle rollers 51 may align the ring member 46 and the driven shaft 22. Further antifriction bearing means in the form of needle rollers 52 may serve for the concentric alignment of ring members 46—33, as will be clear.

In accordance with a feature of the invention, the ring member 47, when clutched to the shift member 37, and hence when fixed against rotation with respect to the frame or housing 42, provides a means for automatic selective operation of the rotor unit 28 of the fluid coupling. In the form shown, the ring member 47 is one element of a one-way engaging or overrunning clutch which may utilize roller means 53 to engage a part of the ring member 33, which, it will be recalled, rotates with the rotor unit 28.

To complete a description of the assembly shown, the main or driven shaft 22 may be journalled for rotation in main bearings, shown as double-row ball bearing means 54, at the end of the frame 42. The inner ring of the ball-bearing means 54 may be held at one end by means of a snap ring 55 and may be positively urged against such abutment by a securing nut 56 on shaft 22, the nut 56 acting against a shoulder on the end flange member 7, as spaced by the worm 57 of a speedometer take-off mechanism (not shown in further detail). A cover plate 58 removably attached to the housing 42 may provide ready access to the shift crank 45 and to other parts, without requiring disconnection of the transmission from the driven shaft or from the engine, as will be clear.

Operation of my transmission will be described for the three possible positions of the gear-shifting means. For the relationship shown, the shiftable dogs 38—35 are free, in an intermediate position between the forward and reverse positions. The transmission is, therefore, in neutral, and no matter how great the speed of rotation of the intermediate driveshaft 9, all relative motion of the planetary system will be lost, since neither of the ring members 33—46 will be connected to the driven shaft 22.

When the shift crank 45 is actuated clockwise, so as to shift the dogs 35—38 forward (to the left in the sense of Fig. 1), the overrunning clutch member 47 will be understood to be locked against rotation, and the sleeve 46 will provide a means for imparting to the driven shaft 22 whatever rotation there may be of the planet gear axes 50—50', about the axis of the driven shaft 22. This position represents connections for a forward drive of the vehicle. When the engine is idling as explained above, there will be substantially no coupling provided in the fluid flywheel, so that the intermediate driveshaft 9 may be at rest. With increasing engine speed, however, the shaft 9 will rotate, to drive the planet gears 24—24'. The direction of engagement of the one-way-engaging or overrunning clutch mechanism is preferably such that under the circumstances (i. e. low engine speed, forward shift connections) the ring member 33, and hence the rotor unit 28 of the fluid coupling, is locked against rotation. The only motion thus permitted the planet gears 24—24. is that they may "walk" around the common axis of the shafts 6—9—22. Since the ring member 33 and hence the ring gear 25 is locked, this slow-speed drive is positive at a fixed low-gear ratio, and the driven shaft 22 may rotate accordingly, at what may be termed a fixed, positive, low-gear ratio in the forward direction.

It will be appreciated that for the relatively slow engine speeds that are involved in the positive low-gear ratio, there may be relatively little rotation of the fluid-coupling pump unit 26 with respect to the rotor unit 28. As the engine speed increases, however, the relative rotation of the pump and rotor units 26—28 may increase correspondingly, until such time as there may be sufficient coupling between units 26—28 to produce a coupled drive of the rotor unit 28. Since the overrunning clutch means is fixed against rotation in one sense only, it may free-wheel or become effectively disengaged when a sufficient coupling exists between the fluid-coupling units 26—28. Once such coupling occurs, the rotor unit 28 may rotate and thus provide a means for increasing the speed of rotation of the planet gear axes about the driveshaft axis. A high-gear transmission will eventually be obtained when the engine speed is great enough to produce most effective coupling between members 26—28, and under such circumstances it will be appreciated that the elements of the fluid coupling and the planetary system may be considered to rotate substantially as a unit with the intermediate driven shaft 9. Since the driven shaft 22 is clutched to the parts which rotate as a unit, the high-gear condition is reached when the gear ratio between shafts 9 and 22 is substantially 1:1.

If, under normal high or under any other lower-gear running conditions, additional torque should be demanded, as when accelerating or when climbing a hill, this torque will first be reflected in a slipping or in a loss of coupling between members 26—28, so that the rotor unit 28 will slow down, thus providing a lower gear ratio through the planetary gear system. It will be understood that the particular low-gear ratio reached for any torque demanded may be that which is best suited to the power output of the engine, as provided, in the form shown, at the intermediate driveshaft 9. Of course, the limit for automatically selected low-gear ratios will occur when the demand torque becomes so great as completely to stop the rotor unit 28 of the fluid coupling. Once stopped, the rotor unit is held by the overrunning clutch means 53 against rotation in the other direction, and low-gear conditions (i. e. positive, direct drive at the lowest gear ratio) again prevail.

For a reverse drive, the clutch-shift arm 45 may be rotated counterclockwise, to shift the dog teeth 35—38 to the right into engagement with the dog teeth 34—32, respectively. Under such conditions, the annular member 31 and hence the pump unit 26 of the fluid coupling (and the axes of planet gears 24—24') will be locked against rotation with respect to the housing 42, and the rotor unit 28 (together with its supporting ring 33 and annular ring gear teeth 25) will be in driving connection with the driven shaft 22. A positive drive connection is thus obtained from the intermediate driveshaft 9 through planet gears 24—24' (on fixed axes) to the ring member 33 and through sleeve 36 to the driven shaft 22. Since reverse gear is normally employed for relatively slow drive speeds, engine speeds will not be high enough to cause destructive coupling between members 26—28 of the fluid coupling. In fact, the increased coupling between members 26—28 which occurs with increasing engine speeds (for the reverse connections) may offset or prevent any tendency to drive too fast in the reverse direction, since the fluid coupling will act as a brake on the engine for the higher reverse speeds.

It will be seen that I have described a relatively simple completely automatic transmission which may provide for the automatic selection of a proper gear ratio between a driving shaft and a driven shaft, the gear ratio depending upon the torque demanded in the loaded shaft and upon the torque available in the driving shaft. The automatic functioning operates independently of the vacuum or other property of the engine and may not, therefore, be subject to variations in engine performance.

In the above specific application of my invention, I have discussed my transmission as an improved substitute mechanism for the low-second-high transmissions customarily installed in production automobiles. No mention has been made of the so-called "cruising gear," but my invention will be understood to be equally applicable thereto. For example, by increasing the pitch diameter of the planet-gear means 24—24' relative to that of the inner or sun-gear means 23 larger spreads in gear ratios will be possible between "low gear" and the highest or direct-drive connection. If a system so modified is used in conjunction with a so-called "slow-speed" rear end or differential, then one may have, in the described transmission unit, a fully automatic selection of drive ratios from positive low gear to fluid-selected "cruising gear," as will be clear.

While I have described my invention in detail for the preferred form shown, it will be understood that modifications may be made within the scope of the invention as defined in the appended claim.

I claim:

In a transmission having a first unit including an element of a fluid coupling connected for rotation with an element of a planetary gear system and with an element of a one-way clutching means, a second unit including another element of said fluid coupling means connected for rotation with another element of said planetary gear system, a third element of the planetary gear system being connected to an input shaft, and shiftable positive-clutching means including two concentric elements longitudinally slidable as a unit into first and second positions whereby in said one position a second element of said one-way clutching means is in engagement with the positive-clutching means to hold the first unit against rotation in one direction and the second unit is positively connected to an output shaft, and in the second position the first unit is positively connected to the output shaft and the second unit is positively held against rotation, to provide respectively variable ratio forward drive in said one position and constant ratio reverse drive in said second position, said positive-clutching means being disposed axially rearwardly of both said first-mentioned units including said one-way clutch means and being provided with two sets of forwardly-positioned clutch teeth, both of said first-mentioned units being provided with two sets of rearwardly-positioned clutch teeth for alternative engagement with alternate sets of clutch teeth of the positive-clutching means.

KENNETH R. DOUGLAS.

References Cited in the file of this patent
UNITED STATES PATENTS

| Number | Name | Date |
|---|---|---|
| 2,131,619 | Duffield | Sept. 27, 1938 |
| 2,146,369 | Dodge | Feb. 7, 1939 |
| 2,158,557 | Lammaren | May 16, 1939 |
| 2,190,831 | Dodge | Feb. 20, 1940 |
| 2,316,390 | Biermann | Apr. 13, 1943 |
| 2,368,873 | Pollard | Feb. 6, 1945 |